April 27, 1926.  1,582,528
R. W. MICHAEL
FUEL AND IGNITION LOCK FOR MOTOR VEHICLES
Filed August 23, 1924   2 Sheets-Sheet 1
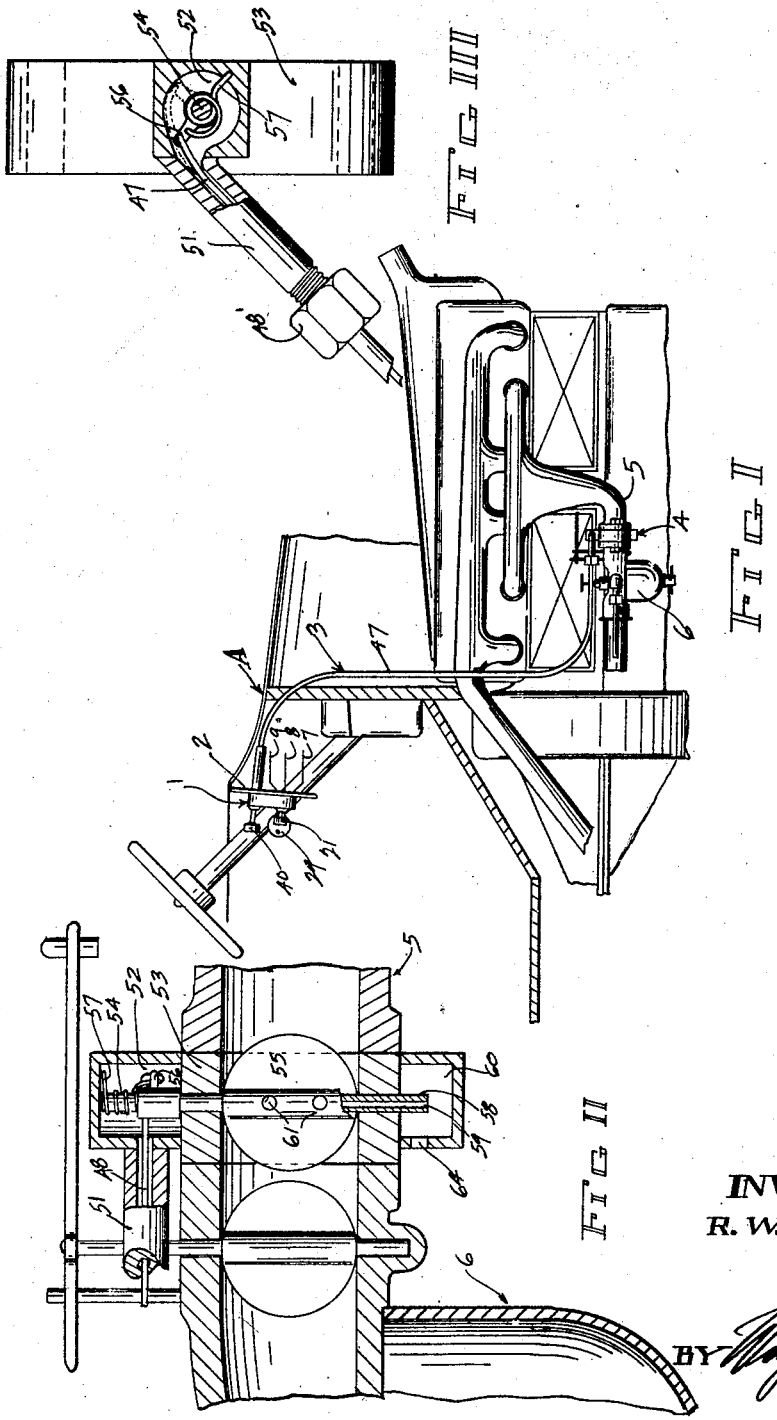
INVENTOR
R. W. MICHAEL
BY
ATTYS BEST AVAILABLE COPY
April 27, 1926.  
R. W. MICHAEL  
1,582,528  
FUEL AND IGNITION LOCK FOR MOTOR VEHICLES  
Filed August 23, 1924    2 Sheets-Sheet 2
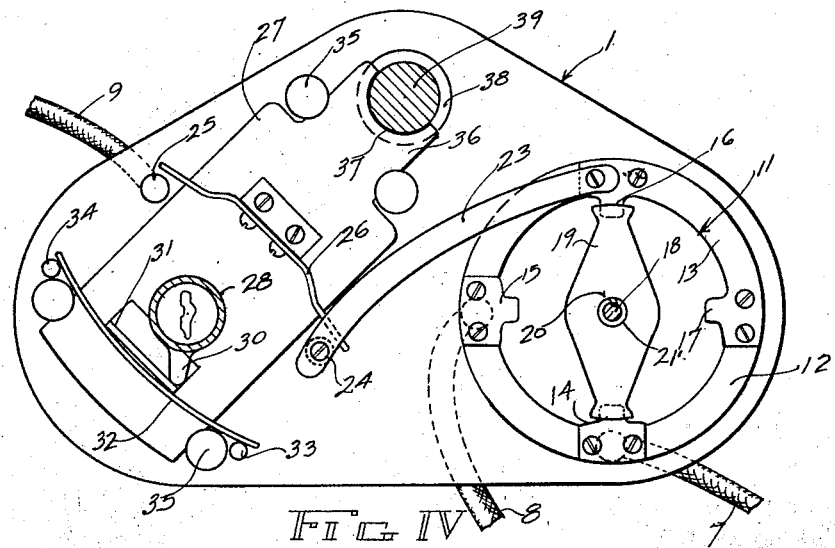
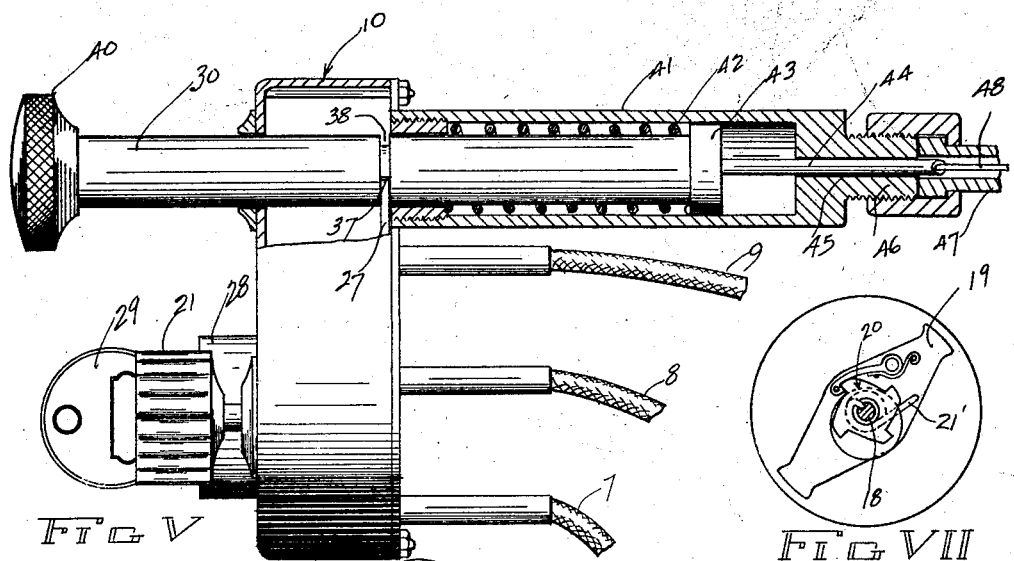
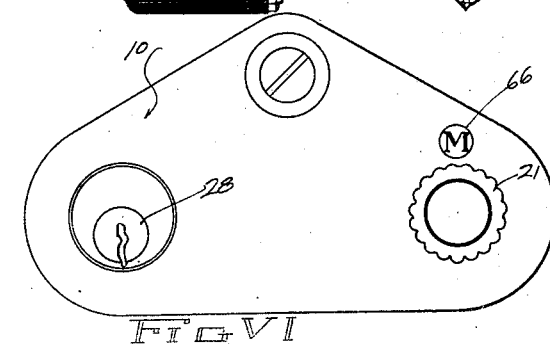
INVENTOR  
R. W. MICHAEL  
BY  
ATTY'S Patented Apr. 27, 1926.

1,582,528

UNITED STATES PATENT OFFICE.

ROBERT W. MICHAEL, OF SAN FRANCISCO, CALIFORNIA, ASSIGNOR, BY MESNE ASSIGNMENTS, TO AUTO-MATIK-AUTO LOCK CO., OF PHOENIX, ARIZONA, A CORPORATION OF ARIZONA.

FUEL AND IGNITION LOCK FOR MOTOR VEHICLES.

Application filed August 23, 1924. Serial No. 733,720.

*To all whom it may concern:*

Be it known that I, ROBERT W. MICHAEL, a citizen of the United States, residing at San Francisco, in the county of San Francisco and State of California, have invented new and useful Improvements in Fuel and Ignition Locks for Motor Vehicles, of which the following is a specification.

This invention relates to improvements in anti-theft means for motor vehicles employing a two-source ignition circuit wherein the electrical energy may be selectively and independently supplied from either source, said anti-theft means being constructed and arranged so that when the motor of the vehicle is running it is impossible to stop the motor without simultaneously shutting off the supply of fuel and breaking the ignition circuit, this operation being effected through the manipulation of a single operating member.

The lock of this invention includes a special switch for independently and selectively applying the electrical energy to the ignition circuit from either a battery or magneto, said special switch being so arranged that it cannot be operated to maintain the ignition circuit broken, regardless of whether the energy is supplied from the magneto or the battery, or in other words, said switch at all times maintains a closed circuit regardless of its manipulation. Another switch is arranged in series with the first named switch and is associated with a means for shutting off the fuel feed to the motor, said switch being enclosed and operating only through and at the time of operation of said fuel feed control means. Thus, regardless of the manipulation of the selective switch the enclosed inaccessible switch remains closed while the fuel control means permits feed of fuel to the engine and said enclosed switch is automatically opened in shutting off the fuel feed.

An object of this invention is to provide a simple, inexpensive, compact lock of the character described which is capable of being readily and easily incorporated with motor vehicles of the type to which this invention relates.

A further object of this invention is to provide in combination with the efficacious locking means, a means for closing the fuel feed conduit between the carburetor and motor, which means establishes communication with the atmosphere, so that atmospheric air may be drawn in through the intake manifold and compressed in the cylinders to produce a braking action without waste of fuel or electrical energy, the ignition circuit being broken when this operation is effected. A further object is to provide a locking mechanism of the character described in which the operating members may be located at a point convenient to the driver, such as for example on the instrument board and a fool proof means of connection provided between the control point on the intake manifold and said operating means, which means of connection is constructed so that it cannot be readily tampered with or broken so as to render the locking mechanism inoperative.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Figure 1 represents a fragmentary longitudinal sectional view of an automobile showing the motor and associated parts in side elevation and likewise showing the locking mechanism of this invention associated with the automobile.

Figure 2 represents an enlarged horizontal sectional view of a part of the carburetor and auxiliary valve mechanism forming a part of this invention.

Figure 3 represents a sectional view of the auxiliary valve mechanism.

Figure 4 represents a front elevation of the lock mechanism with the cover removed, showing such mechanism in locked position, necessary to shut off the fuel feed and open the ignition circuit.

Figure 5 represents a side elevation of the locking mechanism being broken away and shown in part in section as seen.

Figure 6 represents a front elevation of the lock control mechanism.

Figure 7 represents a bottom plan view of the switch mechanism.

The embodiment of the invention shown in the accompanying drawings generally comprises a control mechanism, designated 1 and adapted to be mounted on the instrument board 2 of an automobile A. From the control mechanism a means of connection 3 leads to auxiliary valve mechanism 4 interposed between intake manifold 5 and carburetor 6. The control mechanism 1 includes electrical circuit closers which are electrically connected with the magneto, battery and spark plugs, not shown, by conductors 7, 8, and 9 respectively.

The control mechanism comprises a casing 10 secured in any suitable manner to the instrument board and housing a selective three way switch device 11 comprising a ring 12 of insulation material supporting spaced contact members 13, 14, and 15. The contact member 13 extends for substantially one-quarter of the circumference of the ring and has two contact points 16, and 17. Rotatably mounted in the casing centrally of the ring is a shaft 18, which supports a movable contact arm 19. The contact arm is mounted so that no matter to what position the shaft 11 is moved the ends of said arm will engage with two opposed of the four contact members. In association with the shaft and contact arm is a mechanism which is common in the circuit closer are and generally designated 20 which mechanism includes an operating handle or button 21 attached to the outer end of the shaft by a right hand screw thread connection. This mechanism 20 is such that on turning the handle 21 to the right the shaft turns, first without moving the contact arm 19 and in so turning places a coil spring 21′ under tension. After a predetermined movement of the shaft the spring acts to quickly move the contact arm through one-quarter of a turn so that the ends of the arm 19 will come in contact with the other two opposed contact members. On turning the handle to the left no movement of the shaft takes place as said handle unscrews. It is not thought necessary to further describe this except to say that the shaft projects outwardly through one wall casing so that the handle will be accessible. No matter what degree of movement or manner of movement given the handle and shaft it is impossible to prevent contact of the contact members of this switch except during a brief period required for the spring to snap the contact member 19 out of one contact position into another contact position.

The electrical conductor 7 leading from the magneto is connected with the contact member 14 in any suitable manner and the conductor 8 leading from battery is connected with the contact member 15. Extending from one end of the contact member 13 is a bus bar 23 having one terminal connected with a contact post 24. Opposite this post and spaced therefrom is a contact post 25 to which is connected the conductor 9 that leads to the spark plugs. A movable contact member 26 is fixed to a lock plate 27 disposed within the casing and on manipulation of the lock plate the contact 26 is moved into and out of contact with the posts 24 and 25. The interval of time in which the circuit is broken on changing from magneto to battery or vice versa is not appreciable for reason that the time required to change the circuit closing positions is not sufficient to bring about cessation of motor operation while making the change. Thus the control of the ignition circuit is the circuit closing device which consists of contacts 24, 25, and 26.

The lock plate 27 is a part of mechanism for cutting on and off of the fuel. This mechanism comprises a key operated lock 28 fixed in the usual manner in the outer casing wall and subject to operation by a key 29. On proper manipulation of the key a bolt or lock member 30 forming a part of the lock is moved in an arc against an abutment 31 on the lock plate, said member 30 having its contact end rounded. This abutment on its opposite side engages a leaf spring 32, the ends of which spring bear against lugs 33 and 34, located on the sides of the spring opposite that engaged by the abutment.

The lock plate is slidably held between four lug members 35 fixed to a wall of the casing and at one end is provided with a reduced portion 36 having a semi-circular recess 37 at its outer end. This recessed outer end of the member 30 is adapted to engage in a notch 38 of a plunger 39. The plunger is extended through the casing and on its outer end carries an operating button 40. The rear portion of the plunger is mounted in a casing 41 fixed to the rear of the casing 10, and said plunger is normally urged rearward by a spring 42 surrounding it and abutting a head 43 at the rear end of the plunger. Attached to the rear end of the plunger is a small rod 44 which extends outwardly through the rear wall 45 of the casing 41, and through a threaded nipple 46 formed on said wall. Attached to the nipple is a tube 47 which extends downwardly back of the dash board beneath the hood and to the auxiliary valve mechanism 4. Extending through this tube is a stiff wire 48 one end of which is attached to the rod 44. The carburetor end of the tube 47 is connected by suitable means 48′ to a tubular extension 51 of a chamber 52 provided on one side of the auxiliary valve casing 53. The wire extends through this tubular extension and into said chamber. One of the trunnions 54 of the valve 55 extends in said chamber and carries a crank arm 56 operating against the action of a spring 57, which spring operates to hold the valve closed. The wire 48 is attached to the crank arm. The valve casing 53 is fastened between the manifold 5 and the carburetor 6 so that said valve directly controls the fuel line from the carburetor to the engine.

The other trunnion 58 of the said valve is hollow, or in other words, has a passage 59 extending from its outer end into a chamber 60 provided on the other side of the valve. The passage 59 has outlet openings 61. The chamber 60 is provided with atmospheric air intake opening 64 and in this way when the valve is closed and shuts off the fuel, atmospheric air will be taken into the manifold thence to engine as a braking medium when the motor is in gear and the ignition circuit shut off. The employment of this means for intaking atmospheric air also prevents the suction of the engine from drawing the lubricating oil into the explosion chamber and bringing about difficulties in the firing of subsequent charges of fuel.

An indicating device 66 is employed in conjunction with the switch 11 so that the operator may readily select one of the two sources of electrical energy, namely the magneto or the battery.

In the operation of the lock of this invention, assuming that it is locked, the parts being in the position shown in Figures 4 and 5, to start the motor the operator inserts the key 29 in the lock 28 and on turning the key moves the member 30 against the abutment 31. This withdraws the plate 27 against the action of the spring 32, moving said plate out of the notch 38 in the plunger 39. On this release of the plunger the spring 42 quickly moves the plunger inwardly and through the rod 44, pushes on the wire 48 in the tube 47 so that the crank arm 56 is turned and valve 55 will open. Through this action the fuel line is opened and ready for conducting fuel from the carburetor to the engine. When the plate 27 is withdrawn the contact 26 engages the contact posts 24 and 25, thus closing the ignition circuit. Before manipulation of the lock as just described the operator may, on turning the handle 21, switch on either the battery or the magneto or the operator may change the switch to bring either source into use after the fuel and ignition circuits have been so established.

In order to stop the engine it is necessary to operate the lock mechanism so as to shut off the fuel supply and open or break the ignition circuit, the key only being used to start the motor. Thus each time the motor is stopped the car is locked against unauthorized operation of the motor. To stop the motor and lock the car the operator grasps button 40 and pulls outward on the plunger, so that the wire is pulled and valve 55 is closed. When the valve moves into closed position the notch 38 in the plunger 39 moves into registration with the portion 37 of the lock plate, and said plate quickly moves into the notch so as to lock the plunger in withdrawn position. The key of the lock is taken out before this operation and as the act of removing the key requires the turning of the lock so as to move the member 30 out of operative position, said member will not interfere with the movement of the lock plate into the notch 38. On this movement of the plate the contact 26 is moved out of engagement with the contacts 24 and 25 and the ignition circuit is broken. It will thus be seen that the simple act of pulling outward on the plunger automatically shuts off the fuel supply and breaks the ignition circuit, this in fact being the only way in which the ignition may be turned off and is a considerable safety factor in that each time the operator stops his motor, as in preparation of leaving, the motor is rendered inoperative and the automobile thus locked against theft.

I claim:

1. In a fuel and ignition lock for motor vehicles the combination with an ignition circuit having two sources of supply of electrical energy and a fuel feed line leading from the carburetor to the engine of the motor vehicle, of a selective switch for connecting either source in said circuit which switch at all times maintains an electrical connection with one of the said sources, of an inclosed inaccessible circuit closer for controlling the ignition circuit, a means for shutting off the feed of fuel in said fuel feed line and means of connection between the fuel shutting off means and the inclosed circuit closer causing the circuit closer to open and break the ignition circuit simultaneously with the operation of said fuel shutting off means to shut off the feed of fuel.

2. In a fuel and ignition lock for motor vehicles the combination with the ignition circuit and a fuel feed line leading from the carburetor to the engine of motor vehicle, of a selective switch operable only to maintain either source in electrical connection with said circuit, a circuit closer connected in and controlling said ignition circuit, a valve in said fuel feed line means for opening and closing the valve, means of connection between said valve operating means and circuit closer operating to open the circuit closer when the operating means is actuated to close said valve, and a casing in which said circuit closer is mounted and which renders said circuit closer inaccessible for operation by any agency other than through operation of the valve operating means.

3. In a fuel and ignition lock for motor vehicles the combination with an ignition circuit having two sources of supply of electrical energy and a fuel feed line leading from the carburetor to the engine of the motor vehicle, of a selective switch for connecting either source in said circuit which switch at all times maintains an electrical connection with one of the said sources, an inclosed inaccessible circuit closer for controlling the ignition circuit, a means for shutting off the feed of fuel in said fuel feed line, means of connection between the fuel shutting off means and the inclosed circuit closer causing the circuit closer to open and break the ignition circuit simultaneously with the operation of said fuel shutting off means to shut off the feed of fuel and a key operated lock for locking said fuel shutting off means in shut off position.

4. In a fuel and ignition lock for motor vehicles, the combination with an ignition circuit having two sources of supply of electrical energy and a fuel feed line leading from the carburetor to the engine of motor vehicle of a selective switch operable only to maintain either source in electrical connection with said circuit, a circuit closer connected in and controlling said ignition circuit, a valve in said fuel feed line, means for opening and closing the valve, means of connection between said valve operating means and circuit closer operating to open the circuit when the operating means is actuated to close said valve, a casing in which said circuit closer is mounted and which renders said circuit closer inaccessible for operation by any agency other than through operation of the valve operating means and a key operated lock for locking the valve operating means in position to maintain the valve closed.

5. In a fuel and ignition lock for motor vehicles, the combination with the ignition circuit having two sources of supply of electrical energy and a fuel feed line leading from the carburetor to the engine of motor vehicle, of a selective switch operable only to maintain either source in electrical connection with said circuit, a circuit closer connected in and controlling said ignition circuit, a valve in said fuel feed line, means for opening and closing the valve, means of connection between said valve operating means and circuit closer operating to open the circuit when the operating means is actuated to close said valve, a casing in which said circuit closer is mounted and which renders said circuit closer inaccessible for operation by any agency other than through operation of the valve operating means, and a key operated lock in association with the means of connection for locking said circuit closer and valve operating means in position to maintain the valve closed and the circuit open.

6. A control device for the fuel and ignition circuits of an internal combustion engine comprising in combination with an ignition circuit having two sources of supply of electrical energy, a fuel feed line leading from the carburetor to the engine, a valve in said feed line, a switch operable only to connect either sources in said circuit, another switch for controlling said circuit operable to open and close same, a valve operating means, means of connection between the valve operating means and the second switch providing for opening of the switch on closing of the valve and vice versa, a casing in which the second named switch is inclosed and which renders the operation of the said second named switch impossible except through the manipulation of the valve operating means and a key operated lock operable in association with said switch and valve operative means.

7. In a valve and ignition lock for motor vehicles the combination with the ignition circuit of the engine of the motor vehicle and fuel feed line leading from the carburetor to the motor, of a valve in said feed line, said ignition circuit including independent sources of electrical energy, a switch for selectively connecting either source in said ignition circuit which switch at all times maintains electrical connection with one of the sources, a circuit closer connected in said circuit and by means of which the circuit is opened and closed, a valve operating means, and a lock means in association with the valve operating means and circuit closer providing for opening of the circuit closer when the valve is closed and closing the circuit closer when the valve is open and a casing inclosing said circuit closer and associated parts and by which said circuit closer is rendered inaccessible for operation except through manipulation of the valve operating means.

ROBERT W. MICHAEL.